(12) United States Patent
Holttum

(10) Patent No.: US 9,434,583 B1
(45) Date of Patent: Sep. 6, 2016

(54) FIFTH WHEEL HITCH HOIST

(71) Applicant: Carl Holttum, Philipsburg, MT (US)

(72) Inventor: Carl Holttum, Philipsburg, MT (US)

( * ) Notice: Subject to any disclaimer, the term of this patent is extended or adjusted under 35 U.S.C. 154(b) by 0 days.

(21) Appl. No.: 14/639,684

(22) Filed: Mar. 5, 2015

Related U.S. Application Data

(60) Provisional application No. 61/948,905, filed on Mar. 6, 2014.

(51) Int. Cl.
*B66D 1/36* (2006.01)
*B66C 23/36* (2006.01)
*B62D 65/00* (2006.01)
*B62D 53/08* (2006.01)

(52) U.S. Cl.
CPC ............... *B66C 23/36* (2013.01); *B62D 53/08* (2013.01); *B62D 65/00* (2013.01)

(58) Field of Classification Search
CPC .. B66D 1/60; B66D 3/20; B66D 2700/0183; B66C 23/04; B66C 23/18; B66C 23/20; B66C 23/36; B66C 23/38; B66C 23/44; B66C 23/64
See application file for complete search history.

(56) References Cited

U.S. PATENT DOCUMENTS

| | | | |
|---|---|---|---|
| 2,223,863 A * | 12/1940 | Wunsch | B66C 23/36 212/172 |
| 2,604,302 A | 7/1952 | Francis | |
| 3,881,749 A * | 5/1975 | Berends | B62D 53/065 280/417.1 |
| 3,984,120 A | 10/1976 | Boveia | |
| 4,226,331 A | 10/1980 | Dumond | |
| 4,881,864 A | 11/1989 | Amato | |
| 5,085,408 A | 2/1992 | Norton et al. | |
| 5,100,283 A | 3/1992 | Carty | |
| 5,314,202 A | 5/1994 | Wilkins, Jr. | |
| 5,749,697 A | 5/1998 | Davis | |
| 5,791,858 A | 8/1998 | Sasser | |
| 5,829,605 A * | 11/1998 | Poitras | B66C 23/48 212/180 |
| 6,007,290 A | 12/1999 | Schulz et al. | |
| 6,217,044 B1 * | 4/2001 | Beeche | B62D 7/04 180/24.02 |
| 6,431,577 B1 * | 8/2002 | Chapman | B60P 1/6463 280/491.5 |
| 6,499,610 B2 | 12/2002 | Spitsbergen | |
| 6,631,917 B1 * | 10/2003 | Chapman | B60P 1/6463 280/491.5 |
| 6,705,821 B2 | 3/2004 | Philipps et al. | |
| 6,821,075 B2 | 11/2004 | van der Horn | |
| 6,951,345 B2 | 10/2005 | Wilks | |
| 7,168,727 B2 | 1/2007 | Dick | |
| 7,419,347 B1 | 9/2008 | Cormier | |
| 7,503,549 B2 | 3/2009 | Maturino | |
| 7,594,641 B2 | 9/2009 | Sharp | |
| 7,607,546 B1 | 10/2009 | Hopper | |
| 8,720,864 B2 | 5/2014 | Cote | |
| 2004/0256607 A1 | 12/2004 | Spitsbergen | |
| 2007/0104560 A1 * | 5/2007 | Hall | B60P 1/483 414/494 |

(Continued)

*Primary Examiner* — Emmanuel M Marcelo
(74) *Attorney, Agent, or Firm* — Sarah J. Rhoades

(57) ABSTRACT

Mounted support arms affixed to a fifth wheel pinbox and formed to receive booms provide a sturdy framework for a winch mounting plate. The winch actuates a hitch-hoisting cable which may be attached to a truck hitch to lift it from the bed of a truck and then lower it to a storage location. The hitch hoist may have two mounting arms, two booms, and a winch on a plate with width variability built into the bolting slot patterns. The booms extend from the mounting arms near the winch plate to form an obtuse angle between the booms and the arms. From the horizon, the angle may be viewed to be that of approximately forty-five degrees (45°). An axle is affixed near the end of the booms and holds a cable wheel which guides a cable and hook to raise and lower the hitch with the winch.

23 Claims, 8 Drawing Sheets

(56) References Cited

U.S. PATENT DOCUMENTS

| | | | |
|---|---|---|---|
| 2007/0284852 A1* | 12/2007 | Mater | B60D 1/50 280/507 |
| 2009/0200782 A1* | 8/2009 | Albrecht | B60S 9/04 280/763.1 |
| 2013/0181426 A1* | 7/2013 | Cote | B62D 53/0857 280/425.1 |
| 2014/0015223 A1* | 1/2014 | Banwart | B62D 53/0842 280/476.1 |
| 2015/0225212 A1* | 8/2015 | Avila | B66C 23/44 414/800 |

* cited by examiner

FIG. 3
FIG. 2
FIG. 5
FIG. 4
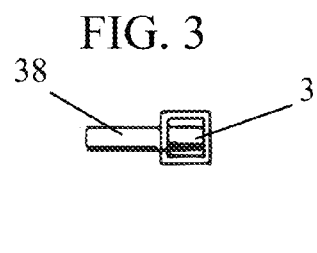
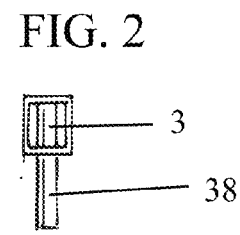
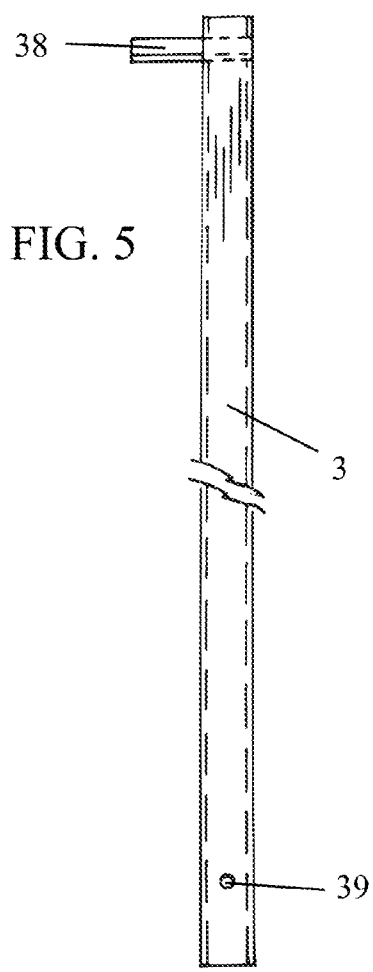
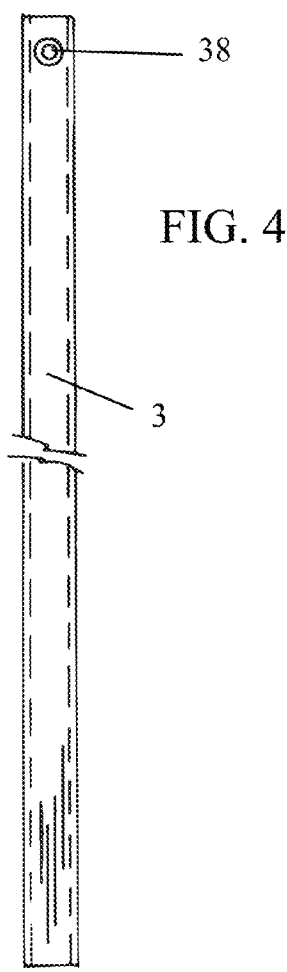

FIFTH WHEEL HITCH HOIST

CROSS-REFERENCE TO RELATED APPLICATIONS

This patent application claims priority under 35 U.S.C. §119(e) to U.S. Patent Application Ser. No. 61/948,905, entitled "Fifth Wheel Hitch Hoist", and filed on Mar. 6, 2014. The entire disclosure of that provisional patent application is hereby incorporated by reference.

STATEMENT REGARDING FEDERALLY SPONSORED Research OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COM PACT DISC

Not Applicable.

BACKGROUND

1. Field of the Invention

This invention relates to fifth wheel trailer hitches and more particularly to devices used to aid in the installation of and removal of a fifth wheel trailer hitch from a vehicle.

2. Description of the Related Art

Recreational vehicles (RV) serve as primary or secondary homes to many retirees. Fifth wheel RV trailers are a particularly popular type of recreational vehicle among retirees because they may travel long distances towing their home. For any trailer user, fifth wheel trailers are also a very popular subset of RV trailers because these models provide extra living space at the same time as allowing preferred maneuverability during transit. Fifth wheel trailers provide a safer mode of towing. Once the RV user arrives at his location, he may stay for an extended period of time and need to have every-day use of the truck he utilized for towing, but now, as a regular mode of transportation.

In order to properly use a fifth wheel trailer, one must install a specific trailer hitch to the user's vehicle. Typically, the fifth wheel hitch is bolted to the interior of a truck bed. The hitch in the truck bed is used to receive the king pin attached to the goose neck pin box extension affixed to the front of the fifth wheel trailer. Fifth wheel trailer hitches are known to be quite heavy and difficult to install and remove from the truck bed. The installation and removal of these hitches can be very difficult. Yet, repeated removal and installation is necessary in order to make full use of the truck whenever the fifth wheel trailer is parked at a campsite or in between travel trips. With the aid of many individuals, removing the hitch from the truck bed is possible. However, aid is not always available.

Prior inventions have sought to install a hitch removal aid in locations such as in garages or other set locations. See, e.g., U.S. Pat. No. 7,503,549 B2 to Maturino. These devices do not serve the need to have the hitch removed while at a campsite or otherwise away from home. Other options require recreationists to carry around a derrick or boom assembly in the back of the truck towing the fifth wheel trailer. These items are heavy in their own right and they also take up precious storage room in the back of the truck. A recent patent to Cote sought to address the need for portability in a hitch removal device, however Cote purports to use nothing more than the overlap between the king pin of the fifth wheel trailer and the plate of Cote's hitch removal device to safely hoist the trailer hitch out of or off of the truck so that the truck may drive away, leaving the hitch suspended in mid-air with only a "frictional communication with the king pin" holding the forked plate end of the device in a "sandwiched" position while the weight of the truck bed hitch dangles at the end of the hoist, 6-8 feet in the air. (See U.S. Pat. No. 8,720,864 B2 to Cote). Cote's hitch removal device is insufficient to address the need in the industry that the hitch removal device be safe to operate while also easy to use. Cote teaches away from the present invention as it seeks to have the entire device be removable from the fifth wheel goose neck hitch yet calls for the use of a electric motor which would be too heavy for the average trailer user to remove and store after each use. Inventions such as those indicated in U.S. Pat. No. 4,881,864 to Amato or US 2004/0256607A1 to Spitsbergen are secured to the hitch receiver of a vehicle and would be unable to be used with fifth wheel trailers as they would necessarily project under the goose neck of the trailer pin box. Other conventional trailer hitch inventions have sought to permanently, or semi-permanently secure various devices to the hitch of a trailer, such as the hitching alignment aids shown in U.S. Pat. No. 5,085,408 to Norton et al. and U.S. Pat. No. 6,951,345 B2 to Wilks, but those inventions have only been used on trailers which were not gooseneck trailers and have no motivation or ability to lift a fifth wheel hitch from a truck. Therefore, fifth wheel enthusiasts need a reliable, portable, light-weight and safe fifth wheel hitch lift and removal device which can be used by a single, often elderly individual.

BRIEF SUMMARY OF THE INVENTION

A fifth wheel hitch hoist is provided for the translation of a fifth wheel hitch from its location for use to a location for storage and then return it to its location for use. In the preferred embodiment, the hoist comprises a combination of two mounting arms, two booms, and a winch. A winch mounting plate is provided to hold the winch. The first mounting arm and second mounting arm are attached to the right and left sides of the fifth wheel trailer pin box and at the end of the arms, a winch mounting plate is mounted to the right and the left mounting arm. The two booms are inserted into two separate receivers in the arms, near in the winch mounting plate. The booms extend from the receivers of the arm combination attached to the mounting plate to for an obtuse angle with the arms. From the horizon, the angle may be viewed to be that of approximately forty-five degrees (45°). An axle is arranged near the end of the booms and holds a cable wheel which allows a guide cable to actuate the raising of the hitch actuated by the winch.

As described herein, the booms and the cable wheel and axle and cable may optionally stay permanently affixed to the mounting plate and arms. A right mounting arm is mounted to the right side of the pin box of a gooseneck trailer. A left mounting arm is mounted to the left side of the pin box of the gooseneck trailer. A winch mounting plate is bolted onto the other ends of right mounting arm and the left mounting arm. A winch is secured to the winch mounting plate. A right boom is inserted into the right arm and pinned with one of the tow pins and the left boom is inserted into the left arm and pinned with the other tow pin. The axle is inserted through one boom and then through the cable wheel and through the other boom. Bolts or threaded fasteners on the outside of each boom secure the axle to the first boom, cable wheel, and second boom. However, hair pins traversing the axle may desirably be used to rotatably secure the axle to the booms. Pins will not loosen over time as easily as threaded fasteners may. The cable from the winch runs over the cable wheel down to the hitch load which may be connected to the cable by a hooking mechanism.

If in use, the trailer is disengaged from the truck hitch to stand alone on devices such as jacks. The hitch is then unbolted from the truck. The hoist's hooking attachment is secured to the hitch. The winch is turned on to lift the heavy fifth wheel hitch, or another heavy load. Using the force of the activated, mounted winch, the hitch is raised through the cooperation of the axle, boom and arm assembly. A cable wheel assists in guiding the cable, rope, or wire pulled by the winch. Once the hitch has been raised off of the truck bed, perhaps as high as 6 to 8 feet off of the ground, the truck may be driven forward and thus, out from under the suspended hitch. The winch direction is reversed, such as by a remote, the cable unravels from the winch and the suspended hitch is lowered to the ground or another storage location and then unhooked or detached from the device. The hitch has been successfully removed from a truck bed or similar location without the user lifting any weight. The process is reversed for raising the hitch from a stored location, such as the ground, onto the truck bed for installation.

More specifically, and in a presently preferred embodiment, by way of example and not necessarily by way of limitation, in preferred operation, the mounting arms and winch assembly of the device are attached to the fifth wheel trailer pinbox itself and remain so throughout the life of the trailer. However, if the device has been optionally disassembled between uses, assembling the device for use is carried out in a series of steps herein. The user is ready to use the device immediately after arriving at a destination campground or RV park, or even after returning home, once the trailer has been properly leveled and set up on its jacking system. If the booms are removed by unfastening the pins, the user first removes the light-weight booms from their stowed location which may be in the neck or other storage compartment of the fifth wheel. Near the winch mounting plate, the boom and related components are attached to the arm receivers by insertion into the sleeves and locking tow pins traversing cooperating holes.

The foregoing has outlined, in general, the physical aspects and steps of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow.

FIG. 2 is a first end view of a detachable boom also demonstrated in FIGS. 3-5. The left boom and the right boom of the preferred embodiment of the present invention are identical.

FIG. 3 is a second end view of a detachable boom as also shown in FIGS. 2, and 4-5.

FIG. 4 is a side view of a detachable boom as also shown in FIGS. 2-3, and 5.

FIG. 5 is a plan view of a detachable boom as also shown in FIGS. 2-4.

DETAILED DESCRIPTION OF THE INVENTION

Figure 1:
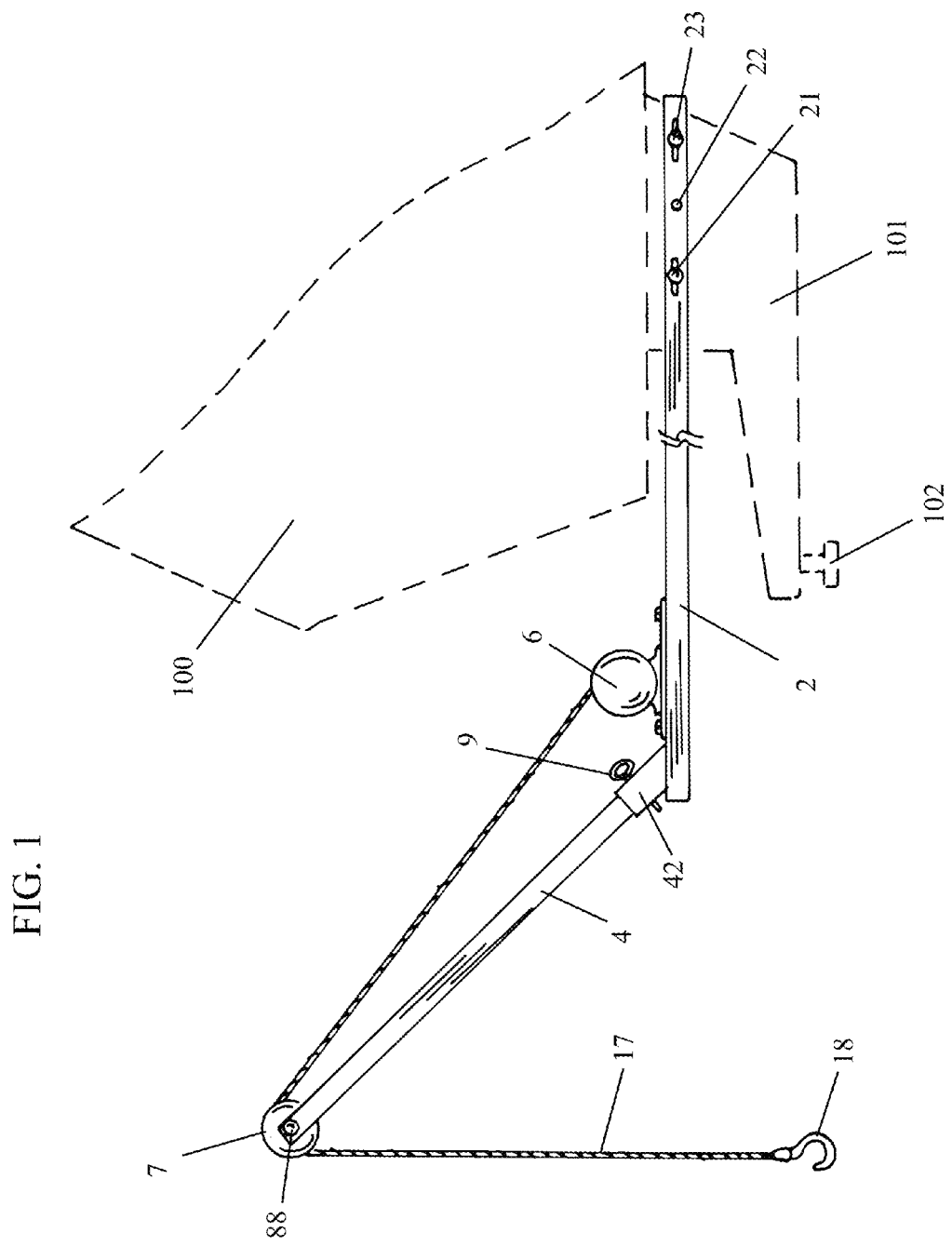
FIG. 1 is a left side view of the present invention installed on a fifth wheel trailer ready for use to transplant a hitch from a truck bed. The fifth wheel trailer, pin box and king pin are shown in broken lines. In these figures, portions of the arm combinations are shown in partial cut away to show that the entire length of the arm may not be shown.

The present invention provides a set of arms mounted on the fifth wheel trailer pinbox. The arm combination provide a framework for a winch mounting plate and optionally removable booms. The booms create a support frame to guide a hitch hoisting cable used to effectuate the transfer of a truck hitch from the bed of a truck to a storage location such as the ground. As illustrated in FIG. 1, the preferred embodiment of the fifth wheel hitch hoist is bolted or otherwise secured onto the pinbox 101 of the fifth wheel trailer 100 at or near the point of attachment of the pinbox 101 onto the trailer 100 and spaced apart from the kingpin 102 so that the fifth wheel trailer's normal towing operations are not compromised. Additional views of connection to a typical fifth wheel trailer 100, pinbox 101, and kingpin 102 are shown in the figures at FIGS. 16-18.

In FIG. 1, the preferred embodiment is demonstrated in side view and shows the left side mounting arm 2 held by a securing members onto the pinbox 101 through the slots 21, 22, and 23. The right side mounting arm 1 is secured in the same manner, but as though in a mirror image (see FIGS. 11-14), onto the other side of the pinbox 101. A winch mounting plate 5 (best seen in FIG. 7) is attached and used to support and join the other ends of the left mounting arm 2 and the right mounting arm 1. A winch 6 is later mounted onto the mounting plate 5. In operation, the winch actuates a cable 17 to transport a truck hitch attached by the hooking mechanism 18 out of or off of the towing vehicle such as a truck bed. See FIGS. 16-18. The preferred embodiment provides a cable wheel 7 which is disposed between the booms 3, 4. In the preferred embodiment, an axle 8 traverses the space between the booms which have axle supports 38, 48 built into the boom frame. The axle supports 38, 48 are sized to receive the axle 8 through their center pipe structure. The features of these components according to the preferred embodiment are illustrated in FIGS. 2-5. The cable wheel 7 shown in FIG. 8 has a hole 78 to receive the axle assembly shown in FIGS. 9a, 9b, 10 and 10a. In one embodiment, a securing member such as a nut 88 joins with the threads on the axle 8 so that the axle assembly is held in its location by the bolting relationship of the assembly, secured on either side of the booms—see FIGS. 1 and 15-16. The preferred embodiment will use hair pins plugged through holes near either end of the axle.

Figure 6:
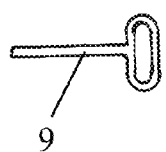
FIG. 6 is a view of a locking pin used to couple the booms to the mounting arms according to the preferred embodiment.
Figure 15:
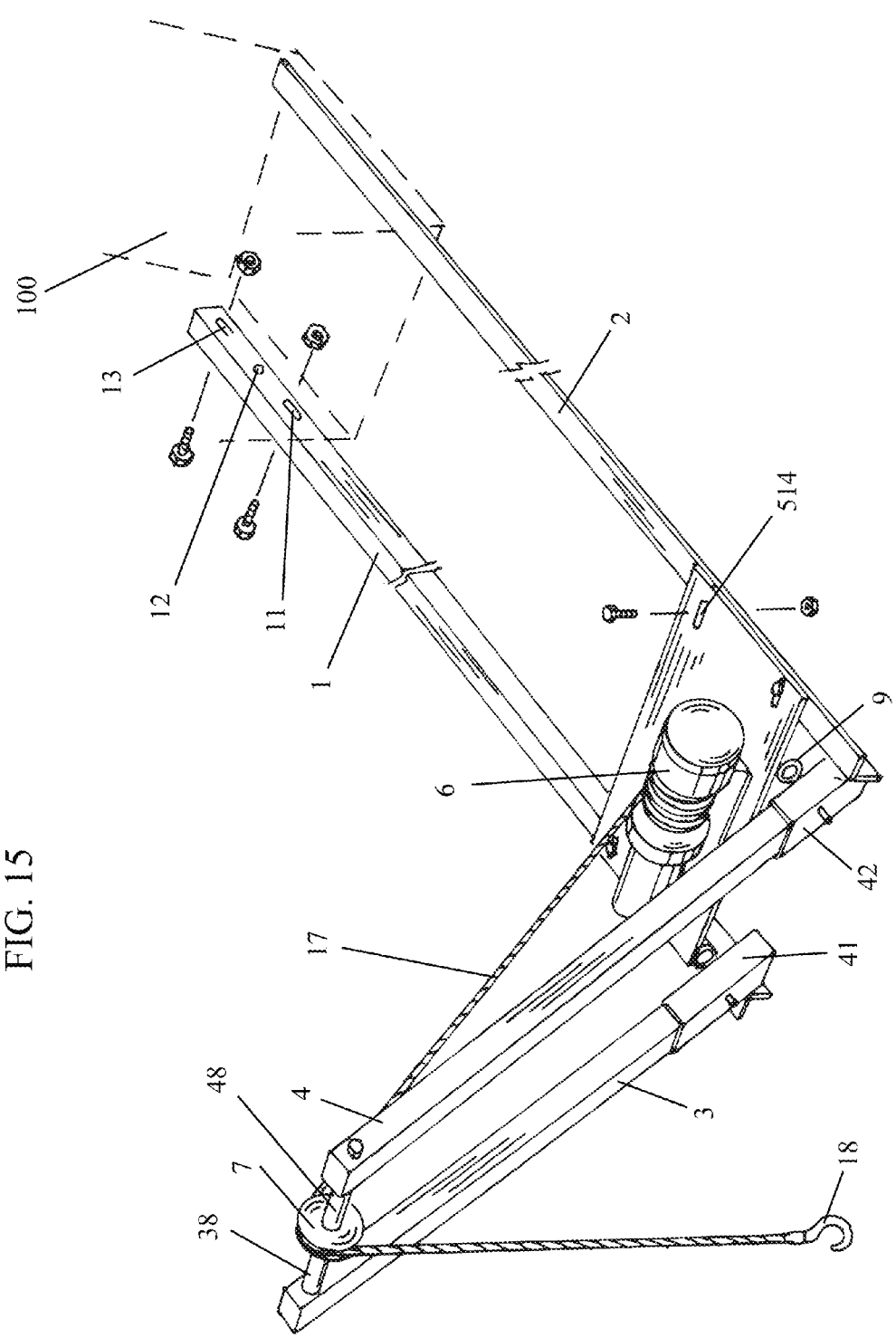
FIG. 15 is a partially exploded, top perspective view of the entire fifth wheel hitch hoist according to the preferred embodiment of the present invention.

As shown in FIGS. 1 and 15, the hoist is assembled by attaching a left boom 4 with the boom receiver 42 of the left mounting arm 2. Then, on the other side, as best viewed in FIG. 15, the right boom 3 is attached via a boom receiver 41 of the right mounting arm 1. The boom receivers 41, 42 are constructed and arranged to engage the booms. In the preferred embodiment, each of the booms 3, 4 is secured by insertion into receiving channels 10, 20 in the receivers 41, 42 of the arms 1, 2 via locking pins 9 such as the one illustrated in FIG. 6. The locking pins 9 traverse the respective receiver holes 49 and the boom holes 39 to lock the boom components in place within the receiving channels 10, 20 of the receivers 41, 42. Other mechanisms could serve the same purposes. For example, it may be desirable to secure the booms in a more permanent manner such as with bolts or welds.

Figure 7:
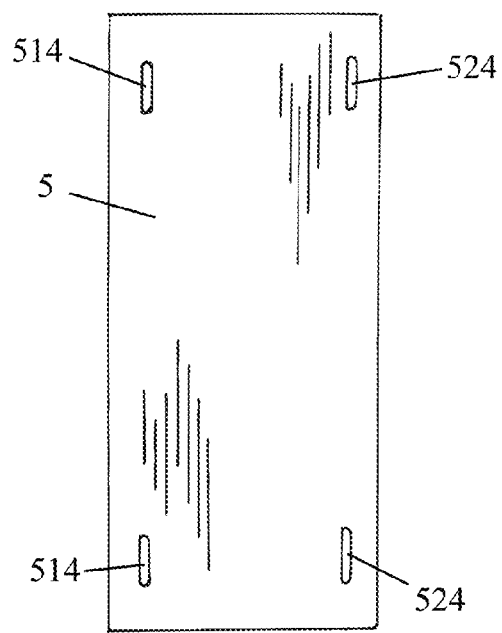
FIG. 7 is a top view of a disassembled winch mounting plate which in use is secured to the mounting arms and supports the winch.
Figure 8:
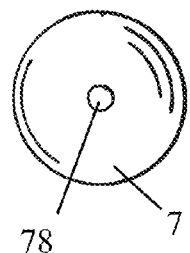
FIG. 8 is a side view of a disassembled cable wheel which in use is secured by the axle to the booms.
Figure 9A:
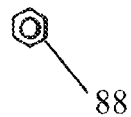
FIG. 9*a* is an first end view of a threaded fastener used to attach the booms and the axle. The preferred embodiment will use a hair pin through the axle body.
Figure 9B:
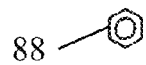
FIG. 9*b* is a second end view of a threaded fastener used to attach the booms and the axle. The preferred embodiment will use a hair pin through the axle body.
Figure 10:
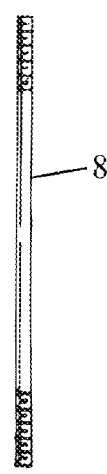
FIG. 10 is a top view of the axle disassembled from the booms.
Figure 10A:
FIG. 10*a* is an end view of the axle disassembled from the booms.
Figures 11, 12, 13, 14:
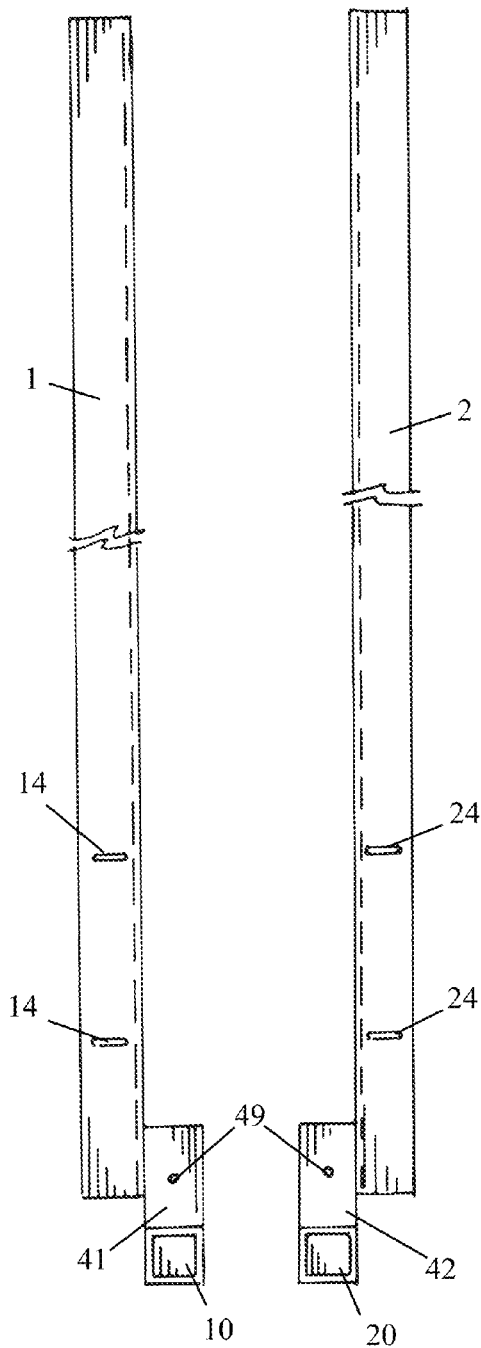
FIG. 11 is a top view of a disassembled right mounting arm which in use is affixed to the right side of the fifth wheel pin box.
FIG. 12 is a top view of disassembled left mounting arm which in use is affixed to the left side of the fifth wheel pin box.
FIG. 13 is a side view of the disassembled right mounting arm also shown in FIG. 11.
FIG. 14 is a side view of the disassembled left mounting arm also shown in FIG. 12.

In the preferred embodiment, the winch mounting plate 5 bolts on to the left mounting arm 2 and the right mounting arm 1. FIG. 7 illustrates one pattern for bolt holes or slots 514 and 524 which join with the right mounting arm 1 and the left mounting arm 2, respectively. As illustrated in FIG. 11, the mounting plate slots 514 join with the right mounting arm 1 such as through pre-drilled holes 14. As illustrated in FIG. 12, the mounting plate slots 524 join with the left mounting arm 2 such as through pre-drilled holes 24. The slots 514 and 524 allow versatility to retrofit various trailer pinbox 101 widths (see, e.g., FIG. 15). The contemplated design will allow the hoist to be used with more than 75% of current trailer pinbox models. The mounting plate 5 provides added stability to the hoist frame.

Figure 16:
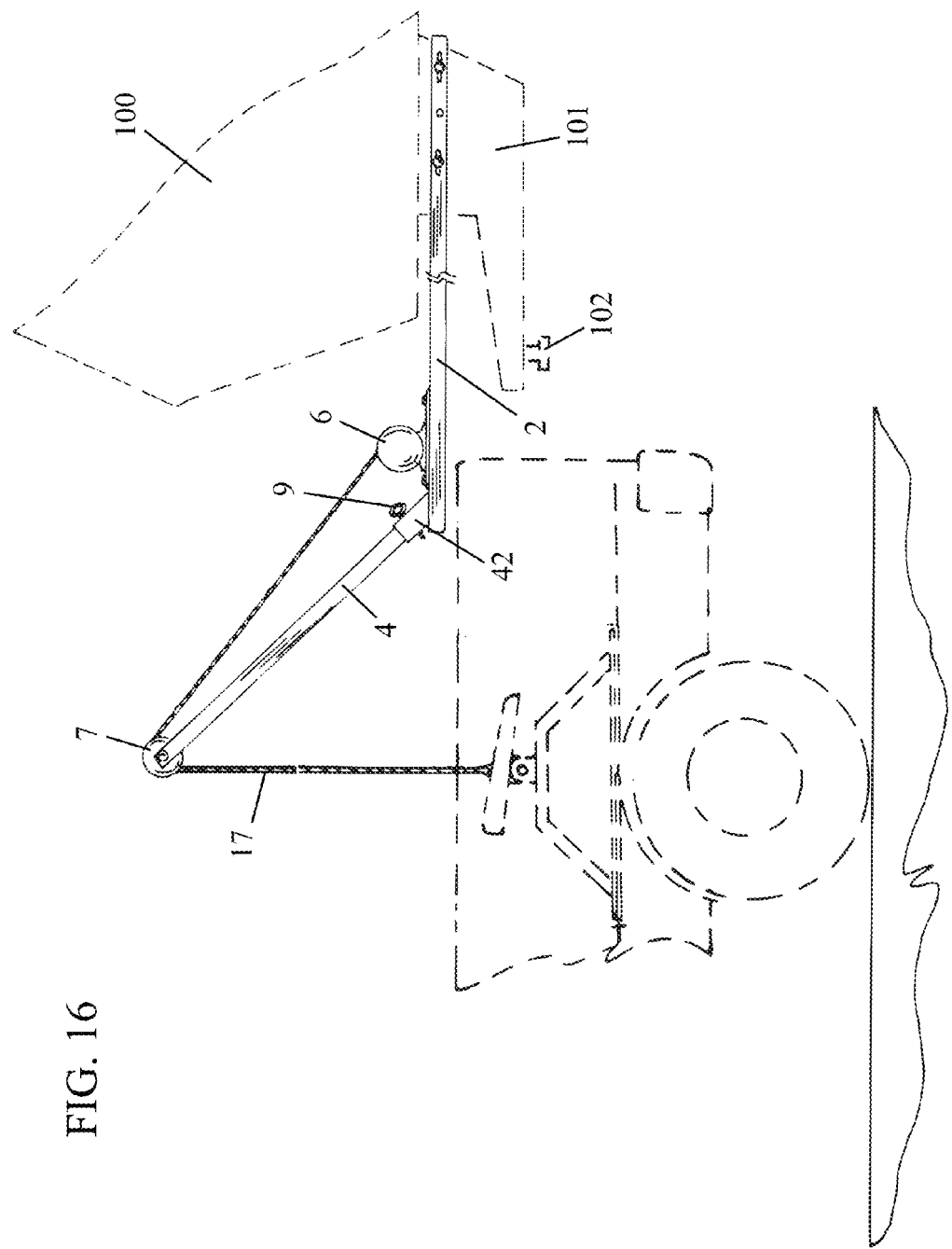
FIG. 16 is a side view of the present invention connected to the fifth wheel hitch in the truck, the front of a fifth wheel trailer, the fifth wheel hitch, and the back of a truck having a fifth wheel hitch are shown in broken lines.
Figure 17:
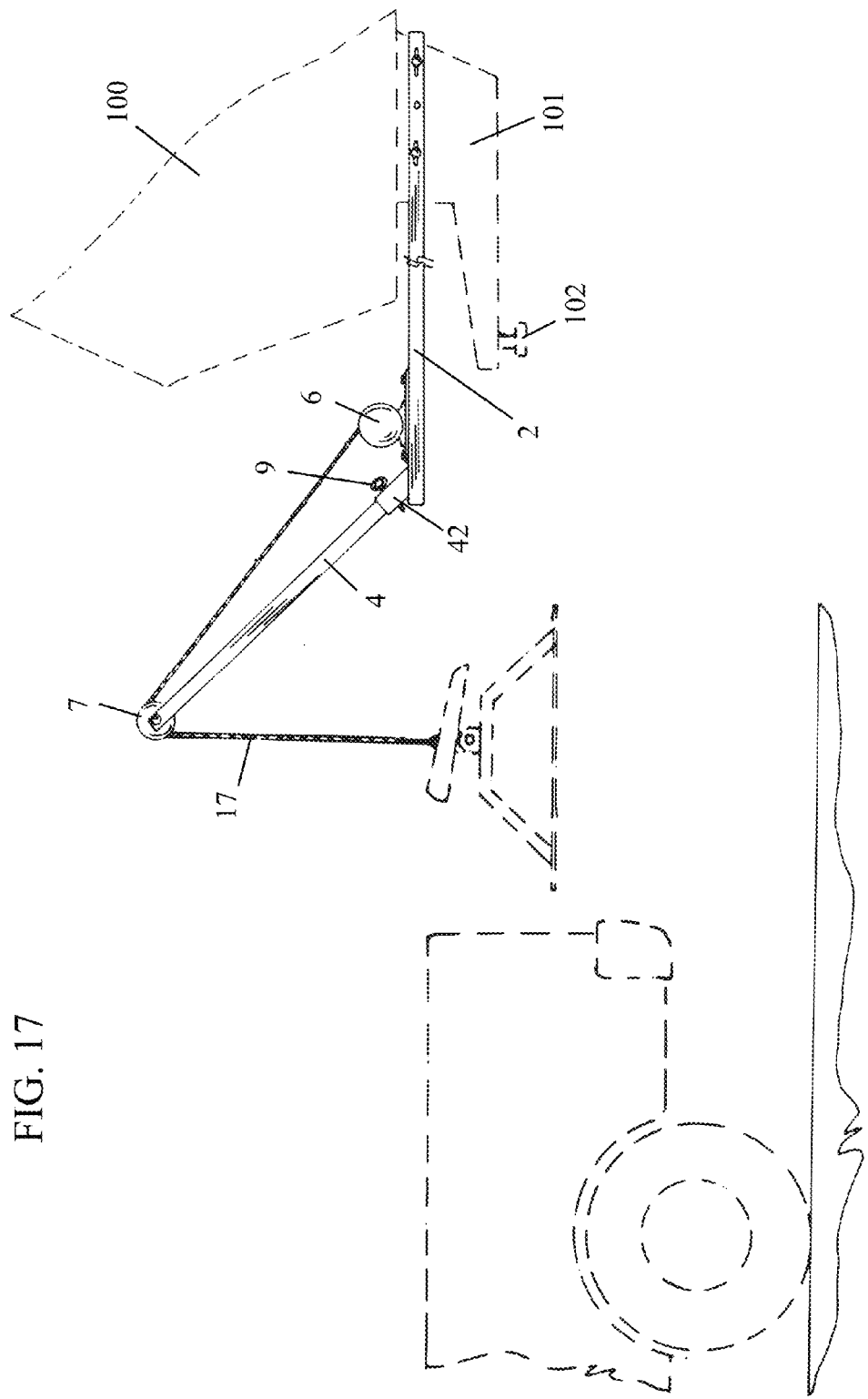
FIG. 17 is a side view of the present invention lifting a fifth wheel hitch and a truck moving freely under the suspended hitch.
Figure 18:
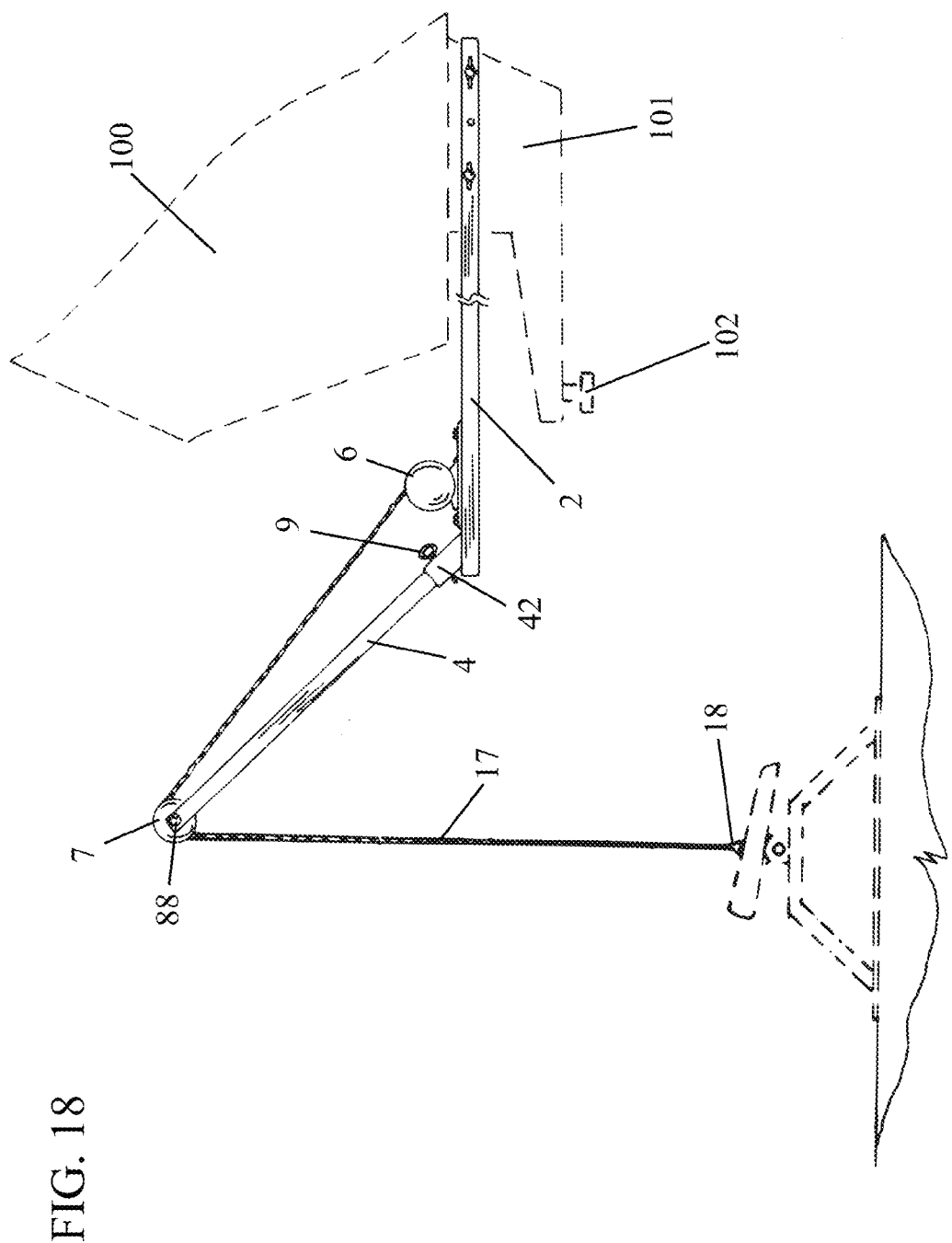
FIG. 18 is a side view of the present invention with the fifth wheel hitch shown in a storage position on the ground and ready to be disconnected for storage or ready to be raised again as shown in FIG. 17.

Through the preferred operation of the hoist, the mounting arms 1, 2 and winch assembly of the device are attached to the fifth wheel trailer pinbox 101 itself and remain so throughout the life of the trailer 100. The user is ready to use the device immediately after arriving at a destination campground or RV park, or even after returning home, once the trailer has been properly leveled and its jacks engaged. If removed, the user first removes the light-weight booms 3, 4 and the attachments of the axle assembly and cable wheel 7 from their stowed location, which may be in the neck or other storage compartment of the fifth wheel 100. The booms 3, 4 are attached to the arms 1, 2 near the winch mounting plate 5 by locking tow pins 9. If previously in use, the hitch is unbolted from the truck. As shown in FIG. 1, the cable 17 is pulled from the winch 6 and over the cable wheel 7. The hooking attachment 18 at or near the end of the cable 17 is secured to the hitch as illustrated in FIGS. 16-18. The mounted winch 6 is activated and the hitch is raised through the cooperation of the axle 8, cable 17, booms 3, 4 and arm assembly. A cable wheel 7 may assist in the guiding the cable, rope, or wire 17 pulled by the winch 6. Once the hitch has been raised a sufficient distance, the truck may be driven forward and thus, out from under the suspended hitch. See, e.g., FIG. 16. When a truck still has its tailgate closed, the hitch may need to be raised as high as 6-8 feet off of the ground. If the bed is open, less height clearance will be needed. In FIGS. 16-18, the truck illustrated has no tailgate and so lower clearance will be satisfactory. The winch 6 is again activated, such as by the remote, and the hitch is lowered to the ground and unhooked from the device. Through these steps, the hitch is removed from a truck bed or similar location. The process is reversed for installing the hitch from a stored location, such as the ground. Referring to FIG. 18, the hitch is connected to the device. The winch 6 is activated to raise the hitch to a sufficient height such that a vehicle truck bed or other towing area may be driven under the suspended hitch and the trailer. See FIG. 17. Once alignment with the correct hitch mounting location has been achieved, the winch 6 is activated to lower the hitch onto the bed or other towing location on the vehicle as shown in FIG. 16. The user bolts the hitch into location and proceeds to join the kingpin of the fifth wheel trailer with the trailer hitch for towing.

As shown in FIGS. 1 and 16-18, the angle and length of the booms 3, 4 as they extend out of the respective mounting arms 1, 2 provide for sufficient reach to extend up to or over the vehicle hitch mounting location such as the bed of the truck. The length of the booms 3, 4 and their angle extending from the mounting arm receivers 41, 42, must also provide reach sufficient to hoist the hitch from its location and hold it clear of the vehicle until the vehicle can be moved out of the line of the drop. In the preferred embodiment, the angle provided between the booms and the arm is obtuse, while the angle between the horizon and the booms is approximately 45 degrees, and the length of the booms 3, 4, are between 46 and 50 inches long, but preferably will be 48 inches long. The mounting arms 1, 2 are between 36 and 40 inches long, but preferably will be 38 inches long.

The bolt slots 21, 22, 23 of the left mounting arm 2 as well as the bolt slots 11, 12, 13 of the right mounting arm 1 according to the preferred embodiment traverse the arms in a pattern shown such as that shown in FIGS. 13-14. FIG. 14 demonstrates one of the bolt slots 21, 22, and 23 patterns for the left mounting arm 2. FIG. 13 demonstrates one of the bolt slots 11, 12, and 13 patterns for the right mounting arm. In the preferred embodiment, the mounting arms 1, 2 and the winch mounting plate 5 including the winch 6, will be permanent accouterments to the fifth wheel trailer pinbox 101. The booms 3, 4 may be removable from the arms 1, 2, if the user prefers, by simply unlocking the locking pins 9 and pulling the booms 3, 4 clear of the arm receivers 41, 42. In the case of removing the booms with their axle supports, the cable wheel 7 and the axle 8 with its bolts would also be removed. These components and the booms 3, 4 should be easily stored in the front cabinets of the fifth wheel trailer 100; however, the booms may remain affixed to the entire hoist system by either the locking pins 9 or another more permanent attachment mechanism.

A typical fifth wheel trailer hitch weighs approximately 200-600 pounds which is why a hoisting assist to lift the hitch from one point to another is so vital. Based on the location of the winch 6, on the winch mounting plate 5 and the point to which the hitch must be hoisted in order to move the vehicle from the drop line, the winch 6 will likely require a minimum lifting capacity of 1500 pounds in order to ensure user safety, but a 2500 pound capacity winch is also an option. The winch capacity could continue to increase so long as it does not exceed the desired weight limit of 30 pounds for any one component of the hoist, for example a current 4000 pound winch weighs about 21 pounds. Similarly, although cable is customly used, it is preferred that a synthetic rope with sufficient tensile strength be the actuating means between the winch 6 and the hitch. The winch 6 may require 12V power which can be supplied through the trailer. The wiring to transfer the power to the winch will be exterior to the trailer and be of a heavy gauge, such as 8 gauge wire. The preferred winch 6 will be provided with a remote control (not shown) to further secure the safety of the user. It is important to the present invention that no part of the fifth wheel hitch hoist weigh more than a total of about 30 pounds in order to be used by the usual, retired fifth wheel trailer enthusiast who will likely be able to individually lift up to 30 pounds at a time.

In the preferred embodiment, the arms 1, 2 and the boom receivers 41, 42 have a width of approximately 2.5 inches by 2.5 inches. The lip of the arms 1, 2 are ⅜ of an inch. The booms are approximately 2 inches by 2 inches. The winch mounting plate 5 is approximately 18 inches by 8 inches but has built in variability supplied by the bolting slot patterns allowing it to be affixed to the existing bolts on about 75% of the trailer pinboxes. The axle supports 38, 48 are approximately 5 inches long. The axle 8 itself is approximately 18 inches long and has a diameter of ⅝ to ¾ of an inch, but must fit within the axle support pipes. By way of example and not as a limitation in any way, the various components of the preferred embodiment may have the following additional details. The fifth wheel hitch hoist can be constructed with the following materials: 2 pieces of angle iron, approximately 2.5 inches by 2.5 inches by ⅜ inch and 36 to 40 inches in length; 2 pieces of square tube 2 inch by 2 inch by 3/16 inch and 46 to 50 inches long; 2 pieces of receiver tube 2 inches square and 6 inches long with a ⅜ inch hole drilled in the middle of the length and width of the tube; 1 steel plate 8 inches by 18 inches by 3/16, or ¼ inch; 1 cable approximately 15-25 feet long; 1 cable chive or cable wheel 3 inches in diameter with a ⅝ to ¾ inch hole through the middle of the wheel; 1 stainless steel rod with a diameter of ⅝ to ¾ inch and a length of about 18 inches long; 2 to 8 pins with corresponding keepers; a hooking mechanism. The hooking mechanism is illustrated as a hook but may comprise any variety of different lifting devices which may be attached to a cable or a strap including closed hooks, plate grippers, lifting bars, a clevis, a caribeanner, snap ring, king pin or similar device that may interact with the hitch. All materials may be desirably substituted for materials of sufficient strength, but with a low weight, and are desirably fabricated of rust-resistant material such as stainless steel.

The arm assemblies are formed through the following operations: Begin by drilling and machining a ¾ inch slot in one of the pieces of angle iron at a distance of about 1 inch from the end of the angle iron. The slot should run lengthwise or parallel with the angle iron, have an approximate length of 2 inches, and should end approximately 3 inches from the end of the iron. A second hole, ¾ inch in diameter is drilled on the same leg of the angle iron about 6 inches from the same end in an approximate center between the first hole and the third hole. The center hole will be used to receive a bolt and attach the device to trailer pin boxes which use three bolts on each side. A third hole is a slot drilled about 9 inches from the same end and on the same leg of the angle iron. This third hole is also the second slot and is sized the same as the first slot, occurs on the same angle iron leg, and is ¾ inch in height by about 2 inches in length. The end of the second slot will be about 11 inches from the same end of the angle iron. See FIGS. 13-14. Whether a fifth wheel trailer pin box uses two or three bolts, the bolt hole pattern will allow the device to accommodate a diverse range of trailer pin boxes. Flipping the same piece of angle iron end for end, and turning the angle iron to work on the other leg of the angle iron, a slot is formed across, or perpendicular to the angle iron leg approximately 7/16 inch by 1 inch in the approximate center of that leg of the angle iron. See FIGS. 11-12. Moving about 6 inches down the same angle iron leg, a second slot with approximately the same size and shape is drilled in the leg such that the slots are approximately 6 inches apart. As can be seen from references to FIGS. 11-14, the slots and holes are on perpendicular legs, or walls of the angle iron and serve different purposes for the device. The pinbox engaging slots 11, 21, 13 and 23 run in a perpendicular direction compared with the mounting plate engaging slots 14, 24. On the same end as on the mounting plat engaging slots, but on the other leg or wall of the angle iron (the same leg that has pinbox holes) a receiver is welded as shown in FIGS. 11-14. The 6 inch piece of 2.5 inch by 2.5 inch receiver tube is welded at about a 45 degree angle with the outer wall even with the point where the two legs join each other going out, and the lower corner of the receiver tube at the lower edge of the angle iron, approximately 2.5 inches from the end of the angle iron. The other end of the receiver tube extends above the leg of the angle iron having the 7/16 inch by 1 inch, mounting plate engaging slots. The receiver tube 41 should be situated such that the ⅜ inch hole in its center is facing up and down (and not against the angle iron). The holes 49 will receive the pins or bolts attaching the booms 3, 4 in the receivers 41. The second arm is fabricated out of the other piece of angle iron in the mirror image of the first arm such that a right arm and a left arm are created. See FIGS. 11-14.

Next, the right boom and left boom are fabricated. While each boom is identical to the next boom, they are assembled in mirror image formation on the hoist. Each square steel tube is drilled with a 1 and ⅛ inch hole at one end of the tube such that the hole goes all the way through the square tube. On the other end of each square tube, the tube is rotated 90 degrees to provide work access to the wall that is perpendicular to the wall with the hole just drilled. On this wall, a hole is drilled that is ⅜ inch in diameter 3 inches from the end of the tube opposite of the end with the 1 and ⅛ inch hole. Each hole traverses the entire tube. This set of holes in the booms will align with the ⅜ inch hole in the center of the receiver tubes such that a pin, bolt, or similar fastening device may traverse two walls of the receiver tube and two walls of the boom. The two ¾ inch iron pipes are inserted through the 1 and ⅛ inch holes in the 2 inch by 2 inch booms 3, 4. Correct construction will result in the end of the pipe being flush with the side of the boom tubes. The flush pipe 38 is welded into the booms as shown in FIGS. 2-5. The boom assembly is now constructed in an approximate "L" shape.

The winch mounting plate 5 is formed of a steel plate 8 inches by 18 inches by 3/16 inch. As shown in FIG. 7, the plate 5 has four slots 514, 524 machined in the approximate four corners and running parallel with the long (18 inch) side of the plate. The slots 514, 524 are formed by beginning on the short (8 inch) side of the plate and measuring % inch from each short side and 1 inch from the adjoining long side in order to start to machine the slot that will be 7/16 inch by 1 inch long and going with the length of the plate. The slots end up about 6 inches apart along the short side of the plate. More holes may be added to the plate later in order to secure the winch to the winch mounting plate, although welding or other methods could also be used.

The device of the preferred embodiment is assembled by bolting the right arm 1 to the right side of the fifth wheel pin box and the left arm 2 to the left side of the fifth wheel pin box. In most trailers, existing pin box bolts will be removed and replaced with longer bolts which are used to now secure the respective arms to the existing holes in the pin box. It is important to remove the existing bolts holding the pin box onto the trailer one side at a time so that the installer does not have to support the weight of the entire pin box as he secures the device to the pin box. Correct installation of the arms will be assured by confirming that the receiver tubes 41, 42 welded on the opposite end of each arm is facing in an upward rather than a downward direction and again, the receiver tubes 41, 42 are directed toward the truck or towing vehicle. The winch mounting plate 5 is bolted to the top of the right arm and the top of the left arm with bolts. The booms 3, 4 are inserted into the receivers 41, 42 as the square tube of the booms nests in receiving tubes. The welded ¾ inch pipe of the L-shaped boom assembly should face inward toward the inwardly facing pipe of the other boom. Pins 9 are inserted through the holes 49 in the boom assemblies to the receiving tubes 41, 42 to hold the boom assemblies in place. Bolts may also be used but are less desirable as they may loosen over time and pins may be readily removed to release the boom assembly for optional storage. The cable wheel 7 with an interior hole 78 is mounted between the axle supports of the right and the left booms. The axle 8 is inserted halfway into the right or left boom through the ¾ inch axle support pipe. The cable wheel 8 is mounted on the axle 8 via the hole 78. The axle 8 is then pushed through the ¾ inch axle support pipe of the other boom. When assembled, the axle 8 traverses the first boom, the first axle support pipe, the cable wheel hole, the second axle support pipe, and the second boom and is secured on each end such as by a threaded fastening system, but may also have a more sure fastening system which will not loosen over time, such as hair pins in holes on each end of the axle.

The winch 6 is mounted on the mounting plate 5 and bolted in place. It will be preferred to measure, mark, and drill holes that will coordinate with the frame of the winch body such that, after it is bolted, it is centered on the plate. In most instances, a minimum of four holes and corresponding fasteners will be used to secure the winch 6 to the winch mounting plate 5. The cable 17 and hooking mechanism 18 may be provided with the winch 6 or may be provided after the fact. When the trailer is parked and rests safely on its jacks, the hoisting device may be used. Cable slack is pulled from the winch 6 and runs along the frame created by the booms, over the cable wheel 17, and down to the load where the hooking mechanism 18 is attached to the fifth wheel hitch to be lifted. After the hitch is unbolted from its towing location such as in the bed of the truck, the hitch is ready to be lifted by the hoisting device. The winch 6 is activated either on the winch itself or by remote control. The hooking mechanism 18 holds the hitch and the cable 17 pulls the hooking mechanism 18 and the hitch upward from the truck. When sufficient clearance of the truck bed or tail gate is achieved, the winch 6 may be stopped. The truck may be moved forward, out from under the hitch and the device. The winch 6 is again activated to lower the hooking mechanism 18 holding the hitch to the ground or other secure storage location under the trailer goose neck. The winch 6 is turned off and the hooking mechanism 18 is detached from the hitch. The winch 6 may be reactivated to retract the cable 17 to a safe storage location. The hoisting device remains with the trailer or the boom assembly, axle assembly and cable wheel 7 may be removed and conveniently stored. When the user is ready to reinstall the hitch, any removed parts will be reassembled. The cable 17 is again pulled from the winch and threaded over the cable wheel 7 and down to the hitch where the hooking mechanism 18 is again attached to the hitch. The winch 6 is activated to raise the hitch to a height sufficient to allow the truck bed or other towing location to be backed up under the hitch. The vehicle is placed in reverse and moved to a point where the hitch is again under the towing location. The bolts may be installed to hold the hitch in the truck. The hooking mechanism 18 is removed from the hitch. The cable 17 with the hooking mechanism 18 is desirably retracted to the winch. The boom assembly, axle assembly, and cable wheel may be optionally removed and stored or may remain attached to the arm combination affixed to the trailer's pin box 101. The device remains in place and is ready to use the next time the user wishes to lift the hitch from the truck bed.

It is further intended that any other embodiments of the present invention which result from any changes in application or method of use or operation, method of manufacture, shape, size, or material which are not specified within the detailed written description or illustrations contained herein yet are considered apparent or obvious to one skilled in the art, are within the scope of the present invention.

I claim:

1. A device for lifting and lowering a fifth wheel hitch for a gooseneck trailer, the gooseneck trailer having a pin box and a king pin to accommodate towing of the fifth wheel trailer, the device comprising:
   an arm combination,
      wherein the arm combination has a proximal end and a distal end,
         the proximal end of the arm combination affixes to the gooseneck trailer pin box,
         the distal end of the arm combination terminates in a receiver,
   a boom assembly,
      the boom assembly inserts into the arm combination receiver and extends at a substantially vertical angle,
   a winch mounted on a plate,
      the plate being secured near the distal end of the arm combination,
   a cable secured in the winch,
      the cable being supported by and tracking with the angle of the boom assembly and extending a distance to reach the hitch, the cable terminates in a hooking mechanism,
wherein the cable hooking mechanism attaches to the hitch and lifts and lowers the hitch with force actuated by the winch.

2. A device according to claim 1, wherein the arm combination further comprises a first arm and a second arm.

3. A device according to claim 2, wherein the first arm is affixed a first side of the fifth wheel trailer pin box and the second arm is affixed to a second side of the fifth wheel trailer pin box.

4. A device according to claim 1, wherein the boom assembly further comprises a first boom and a second boom.

5. A device according to claim 1, wherein the arm combination further comprises a first arm and a second arm,
the first arm is affixed a first side of the fifth wheel trailer pin box and the second arm is affixed to a second side of the fifth wheel trailer pin box,
the first arm terminates in a first receiver,
the second arm terminates in a second receiver.

6. A device according to claim 5, wherein the boom assembly further comprises a first boom and a second boom,
the first receiver receives the first boom and
the second receiver receives the second boom.

7. A device according to claim 6, wherein the first boom and the second boom each further comprise an axle support.

8. A device according to claim 7, wherein the axle support secures an axle.

9. A device according to claim 8, wherein the axle secures a cable wheel to guide the cable.

10. A device according to claim 1, wherein the boom assembly further comprises an axle.

11. An device according to claim 10, wherein the axle is secured near a distal end of the boom assembly.

12. A device according to claim 10, wherein the boom assembly further comprises a cable wheel, wherein the cable wheel turns on the axle and guides the cable.

13. A device according to claim 1, wherein the hooking mechanism of the cable attaches to the hitch and the winch retracts the cable to lift the hitch.

14. A device according to claim 1, wherein the hooking mechanism of the cable attaches to the hitch and the winch releases the cable to lower the hitch.

15. A device according to claim 1, wherein the cable works in concert with the winch mounted on the plate, the boom assembly, an axle assembly, and the hooking mechanism to lift the fifth wheel hitch.

16. A device according to claim 1, wherein at least the arm combination, the winch mounting plate, and winch are permanent accouterments to the fifth wheel trailer pin box.

17. A device according to claim 1, wherein the boom assembly extends from the arm combination to form an obtuse angle with the arm combination.

18. A device according to claim 1, wherein the substantially vertical angle is approximately forty-five degrees (45°) from horizontal.

19. A device according to claim 1, wherein the arm combination is secured to the trailer pin box with spacing apart from the king pin such that normal towing operations are not compromised.

20. A method for using the device in claim 1 to remove the fifth wheel hitch from a vehicle, the method comprising:
a. permanently affixing portions of the hoisting device to the fifth wheel trailer pin box;
b. towing the trailer normally until towing is complete and the vehicle is stopped;
c. detaching the fifth wheel trailer kingpin from the fifth wheel hitch of the vehicle when trailer towing has ceased;
d. parking the fifth wheel trailer with the support of jacks;
e. aligning the hitch in the vehicle under the hoisting device;
f. parking the vehicle and unbolting the hitch from the vehicle;
g. attaching the hoisting device to the fifth wheel hitch on the vehicle;
h. using the device to hoist the hitch off of the vehicle;
I. driving the vehicle forward until the hoisted hitch is no longer over the vehicle;
j. activating the hoisting device to lower the hitch onto the ground.

21. A method according to claim 20, wherein the method further comprises:
k. detaching the hoisting device from the hitch.

22. A method for using the device in claim 1 to lift the fifth wheel hitch into a vehicle, the method comprising:
a. permanently affixing portions of the hoisting device to the fifth wheel trailer pin box;
b. locating the fifth wheel hitch below the hoisting device;
c. attaching the hoisting device to the hitch;
d. activating the hoisting device to raise the hitch to a sufficient height that the vehicle may fit under hitch;
e. backing the vehicle to align the hitch attached to the hoisting device under the location for attaching the trailer hitch in the vehicle;
f. parking the vehicle;
g. lowering the hitch onto the vehicle and bolting the hitch to the vehicle;
h. attaching the fifth wheel trailer kingpin to the fifth wheel hitch of the vehicle when the towing of the trailer is desired; and
I. towing the trailer normally.

23. A method according to claim 22, wherein the method further comprises:
j. detaching the hoisting device from the hitch.

* * * * *